United States Patent
Yin et al.

(10) Patent No.: US 10,289,886 B2
(45) Date of Patent: May 14, 2019

(54) METHOD FOR DETERMINING OPTICAL SENSING CORRECTION PARAMETERS, BIOLOGICAL FEATURE DETECTION APPARATUS AND ELECTRONIC TERMINAL

(71) Applicant: SHENZHEN GOODIX TECHNOLOGY CO., LTD., Shenzhen (CN)

(72) Inventors: Ting Yin, Shenzhen (CN); Jing Gu, Shenzhen (CN); Shu Pang, Shenzhen (CN)

(73) Assignee: SHENZHEN GOODIX TECHNOLOGY CO., LTD., Shenzhen (CN)

( * ) Notice: Subject to any disclaimer, the term of this patent is extended or adjusted under 35 U.S.C. 154(b) by 42 days.

(21) Appl. No.: 15/796,731

(22) Filed: Oct. 27, 2017

(65) Prior Publication Data

US 2019/0019002 A1 Jan. 17, 2019

Related U.S. Application Data

(63) Continuation of application No. PCT/CN2017/093090, filed on Jul. 17, 2017.

(51) Int. Cl.
*G06K 9/20* (2006.01)
*G06K 9/00* (2006.01)
*H04N 17/00* (2006.01)

(52) U.S. Cl.
CPC ..... *G06K 9/00013* (2013.01); *G06K 9/00067* (2013.01); *H04N 17/002* (2013.01)

(58) Field of Classification Search
CPC ........... G06K 9/0004; G06K 9/00006–9/0012; G06K 9/00067; G06K 9/03–9/036; H04N 17/002; G01J 2001/444
See application file for complete search history.

(56) References Cited

U.S. PATENT DOCUMENTS 7,324,236 B2 * 1/2008 Ohashi ................. H04N 1/4076
358/1.18
2003/0025815 A1 2/2003 Hashimoto
(Continued)

FOREIGN PATENT DOCUMENTS

CN 101800837 A 8/2010
CN 102541309 A 7/2012
(Continued)

OTHER PUBLICATIONS

Mansouri et al., "Development of a Protocol for CCD Calibration: Application to a Multispectral Imaging System", International Journal of Robotics and Automation, 2005, Journal 206.2005.206-2784, 9 pages total. (Year: 2005).*

*Primary Examiner* — Brian Werner

(57) ABSTRACT

Embodiments of the present application provide a method for determining optical sensing correction parameters, a biological feature detection apparatus and an electronic terminal. The method includes: determining a light intensity of this group of optical signals according to output data generated by a plurality of optical sensing units once under irradiation of the same group of optical signals to determine light intensities of a plurality of groups of optical signals; and determining optical sensing correction parameters of the plurality of optical sensing units according to the output data generated by the plurality of optical sensing units once under irradiation of each group of optical signals and the light intensities of the plurality of groups of optical signals.

19 Claims, 6 Drawing Sheets

(56) References Cited

U.S. PATENT DOCUMENTS

| | | | |
|---|---|---|---|
| 2004/0156555 A1* | 8/2004 | Irving | G06K 9/00026 |
| | | | 382/274 |
| 2005/0128475 A1* | 6/2005 | Imura | G01J 1/08 |
| | | | 356/300 |
| 2007/0201760 A1 | 8/2007 | Brown | |
| 2007/0247514 A1 | 10/2007 | Waidman et al. | |
| 2008/0166033 A1 | 7/2008 | Bueno et al. | |
| 2009/0021487 A1 | 1/2009 | Tien | |
| 2009/0160944 A1 | 6/2009 | Trevelyan et al. | |
| 2010/0194956 A1 | 8/2010 | Yuan et al. | |
| 2014/0023249 A1 | 1/2014 | Higuchi | |
| 2016/0078270 A1 | 3/2016 | Lee et al. | |
| 2017/0195654 A1 | 7/2017 | Powers et al. | |
| 2017/0289805 A1* | 10/2017 | Hong | G09G 3/3233 |
| 2018/0164158 A1* | 6/2018 | Lee | G01J 1/42 |
| 2018/0374424 A1* | 12/2018 | In | G09G 3/3258 |

FOREIGN PATENT DOCUMENTS

| | | |
|---|---|---|
| CN | 102948094 A | 2/2013 |
| CN | 104700070 A | 6/2015 |
| EP | 3182329 A | 6/2017 |

\* cited by examiner

METHOD FOR DETERMINING OPTICAL SENSING CORRECTION PARAMETERS, BIOLOGICAL FEATURE DETECTION APPARATUS AND ELECTRONIC TERMINAL

CROSS-REFERENCE TO RELATED APPLICATIONS

The present application is a continuation of international application No. PCT/CN2017/093090 filed on Jul. 17, 2017, which is hereby incorporated by reference in its entirety.

TECHNICAL FIELD

The present application relates to the technical field of biological feature identification, and in particular, relates to a method for determining optical sensing correction parameters, a biological feature detection apparatus and an electronic terminal.

BACKGROUND

Optical biological feature identification apparatuses may be applied to electronic terminals to implement optical biological feature identification, and thus to further implement identity authentication for users of the electronic terminals. When an object under test is placed on the biological feature identification apparatus, light emitted by a light source forms reflective light via a biological tissue of the object under test, and then the light is directed to optical sensing units of the biological feature identification apparatus; each of the optical sensing units further converts received light intensity signals into electrical signals to thus generate output data. For example, when the object under test is fingerprints of a finger, since the fingerprints have different texture depths, the light intensity signals received by the optical sensing units are capable of reflecting texture depths in different regions of the finger. In this way, fingerprint features of the object under test may be finally determined according to the output data generated by all the optical sensing units in the optical biological feature identification apparatus. In addition, based on the similar principle, palmprint features may also be determined.

However, the optical biological feature identification apparatus generally includes an optical filter and an optical sensing array formed by the optical sensing units. The optical sensing units may be different from another. In addition, when the optical biological feature identification apparatus is applied to an electronic terminal having a display screen, a display unit of the display screen (for example, an OLED light source of an OLED display screen) may be used as an excitation light source of the optical biological feature identification apparatus. Since bonding between the display screen and the optical filter may be not even and flat, the optical filter and the optical sensing array may also be subjected to uneven bonding. As a result, different optical sensing units have inconsistent sensing capabilities with respect to optical signals having the same light intensity, and thus during determination of biological features of the object under test based on the output data of thousands of optical sensing units, the detection result is poor in accuracy. Consequently, identity authentication may finally fail to be performed for users by using the optical biological feature identification apparatus.

SUMMARY

Embodiments of the present application are intended to provide a method for determining optical sensing correction parameters, a biological feature detection apparatus and an electronic terminal, to solve the above technical problem in the related art.

In a first aspect, embodiments of the present application provide a method for determining optical sensing correction parameters. The method includes:

subjecting a plurality of optical sensing units in an optical sensing array to irradiation respectively with the use of a plurality of groups of optical signals, where each optical sensing unit generates a group of output data once under irradiation of each group of optical signals;

determining a light intensity of this group of optical signals according to the output data generated by the plurality of optical sensing units once under irradiation of the same group of optical signals; and determining optical sensing correction parameters of the plurality of optical sensing units according to the output data generated by the plurality of optical sensing units once under irradiation of the plurality of groups of optical signals and the light intensities of the plurality of groups of optical signals.

Embodiments of the present application further provide a biological feature detection apparatus. The biological feature detection apparatus includes an optical sensing array and a detection chip. The optical sensing array includes a plurality of optical sensing units configured to receive irradiation from the plurality of groups of optical signals, where each optical sensing unit generates a group of output data once under irradiation of each group of optical signal. The detection chip is configured to determine a light intensity of this group of optical signals according to the output data generated by the plurality of optical sensing units once under irradiation of the same group of optical signals to determine light intensities of the plurality of groups of optical signals, and determine optical sensing correction parameters of the plurality of optical sensing units according to output data generated by the plurality of optical sensing units once under irradiation of each groups of optical signals and the light intensities of the plurality of groups of optical signals.

Embodiments of the present application further provide an electronic terminal. The electronic terminal includes the above biological feature detection apparatus.

In the embodiments of the present application, a light intensity of this group of optical signals is determined according to output data generated by a plurality of optical sensing units once under irradiation of the same group of optical signals to determine light intensities of a plurality of groups of optical signals; and optical sensing correction parameters of the plurality of optical sensing units are determined according to the output data generated by the plurality of optical sensing units once under irradiation of each group of optical signals and the light intensities of the plurality of groups of optical signals. In this way, during biological feature detection, the optical sensing units have the consistent light intensity sensing capability with respect to the optical signals having the same light intensity, biological features of an object under test may be identified as accurate as possible, and a case where users fail to experience normal identity authentication via an optical biological feature identification apparatus is prevented.

BRIEF DESCRIPTION OF THE DRAWINGS

To more clearly describe technical solutions according to the embodiments of the present application or in the related art, drawings that are to be referred for description of the embodiments or the related art are briefly described hereinafter. Apparently, the drawings described hereinafter merely illustrate some embodiments of the present application. Persons of ordinary skill in the art may also derive other drawings based on the drawings described herein without any creative effort.

DETAILED DESCRIPTION

To make the objectives, technical features, and advantages of the present application clearer and more understandable, the technical solutions according to the embodiments of the present application are further described in detail with reference to the accompany drawings. Apparently, the embodiments described herein are merely some exemplary ones, rather than all the embodiments of the present application. Based on the embodiments of the present application, all other embodiments derived by persons of ordinary skill in the art without any creative efforts shall fall within the protection scope of the present application.

In the embodiments of the present application, a light intensity of a group of optical signals is determined according to output data generated by a plurality of optical sensing units once under irradiation of the same group of optical signals, to determine light intensities of a plurality of groups of optical signals; and optical sensing correction parameters of the plurality of optical sensing units are determined according to the output data generated by the plurality of optical sensing units once under irradiation of each group of optical signals and the light intensities of the plurality of groups of optical signals. In this way, during biological feature detection, the optical sensing units have the consistent light intensity sensing capability with respect to the optical signals having the same light intensity, biological features of an object under test may be identified as accurate as possible, and a case where users fail to experience normal identity authentication via an optical biological feature identification apparatus is prevented.

In the embodiments of the present application hereinafter, description is given using a case where fingerprint feature detection is implemented using an optical sensing array as an example.

Figure 1:
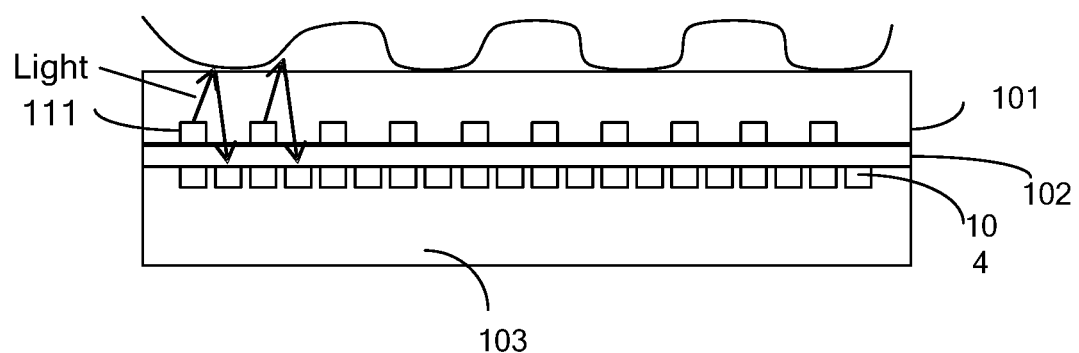
FIG. 1 is a schematic partial perspective view of an electronic terminal employing an optical sensing array according to a first embodiment of the present application.
Figure 2:
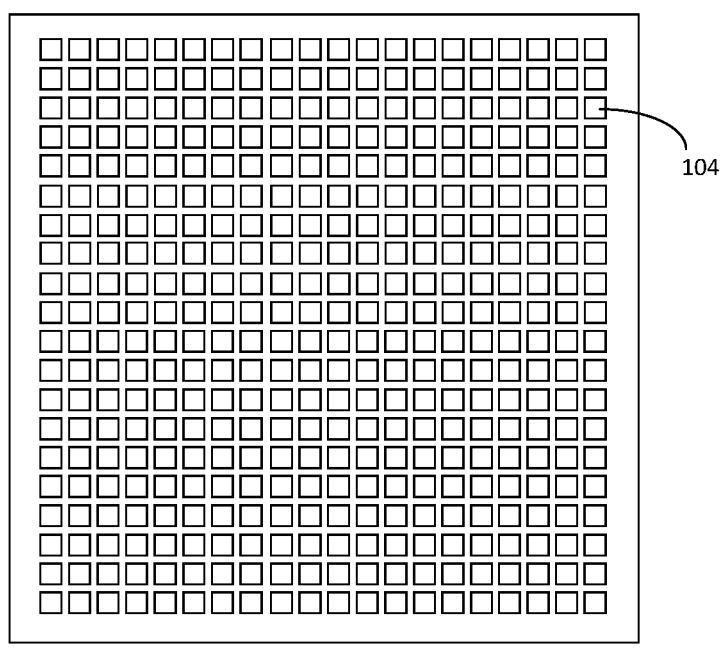
FIG. 2 is a schematic planar view of an optical sensing array of an electronic terminal according to a second embodiment of the present application.

FIG. 1 is a schematic partial perspective view of an electronic terminal employing an optical sensing array according to a first embodiment of the present application. FIG. 2 is a schematic planar view of an optical sensing array of an electronic terminal according to a second embodiment of the present application. In this embodiment, description is given using a case where an optical sensing array is applied to an electronic terminal to implement fingerprint feature identification as an example. Specifically, the electronic terminal includes an organic light-emitting diode (OLED) display screen 101, an optical filter 102 and a fingerprint detection chip 103. The OLED display screen 101 includes a plurality of OLED light sources 111. The optical filter 102 is configured to filter optical signals directed towards a plurality of optical sensing units 104. The fingerprint detection chip 102 includes the plurality of optical sensing units 104, which are arranged as an array on an entire sensing region of the fingerprint detection chip 103.

When a finger is pressed on the OLED display screen 101, optical signals emitted by the plurality of OLED light sources 111 are reflected by the finger to form reflected optical signals which are directed towards the optical sensing units 104. Since the finger has fingerprint texture having different depths, the reflected optical signals directed towards the optical sensing units 102 have different intensities. Therefore, fingerprint features of a finger may be determined according to the reflected optical signals received by the optical sensing units of the optical sensing array.

It should be noted that, FIG. 1 is merely one exemplary illustration of the present application. Under teachings by the embodiments of the present application, the electronic terminal as illustrated in FIG. 1 may also be applied to scenarios of biological feature detection based on an optical sensing principle, such as palmprint feature identification, heart rate feature identification, blood oxygen concentration identification and the like.

In addition, the electronic terminal as illustrated in FIG. 1 includes, but not limited to, a smart phone, a tablet computer, a lap-top computer, a smart bracelet, a smart earphone and the like.

Figure 3:
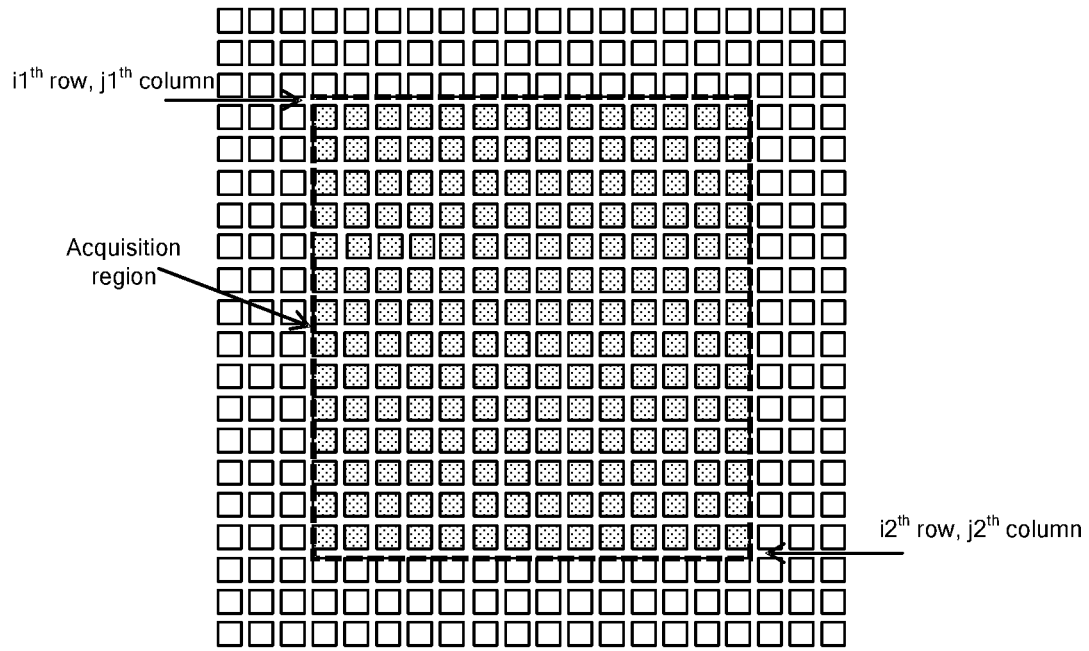
FIG. 3 is a schematic diagram of a specific output data acquisition region selected on an entire optical sensing array according to a third embodiment of the present application.

As illustrated in FIG. 3, a schematic diagram of a specific output data acquisition region selected on an entire optical sensing array according to a third embodiment of the present application is given. The output data acquisition region is configured to determine optical sensing correction parameters of the fingerprint detection chip 103. To eliminate the impacts caused by accidental errors as much as possible, when a plurality of optical sensing units are selected as the output data acquisition region, preferably a plurality of optical sensing units in a typical region shall be selected. Specifically, a finger is generally pressed at an area that is close to the center of an optical sensing array. Therefore, the output data acquisition region may be specifically defined with reference to the center of the optical sensing array. For example, the center of the optical sensing array is used as a reference, and a square region is selected as the output data acquisition region. The center of the square region coincides with the center of the optical sensing array. A plurality of optical sensing units in the selected one or a plurality of output data acquisition region may be configured to perform data acquisition to determine the optical sensing correction parameters. Nevertheless, selection of a predetermined acquisition region is not limited to the above exemplary description.

It should be noted that, in the embodiment as illustrated in FIG. 3, description is given by only using a square output data acquisition region as an example; in other embodiments, the output data acquisition region may be in any shape such as a circle and the like; the position of the output data acquisition region is not limited to only determination with the center of the optical sensing array as a reference; and the number of optical sensing units in the output data acquisition region may be flexibly adjusted according to actual needs.

It should be noted that, on the circumstance where accidental errors are not taken into consideration or accidental errors are small, and/or where slow data processing due to large data volume is ignored, an entire optical sensing array may be selected as the output data acquisition region.

Figure 4:
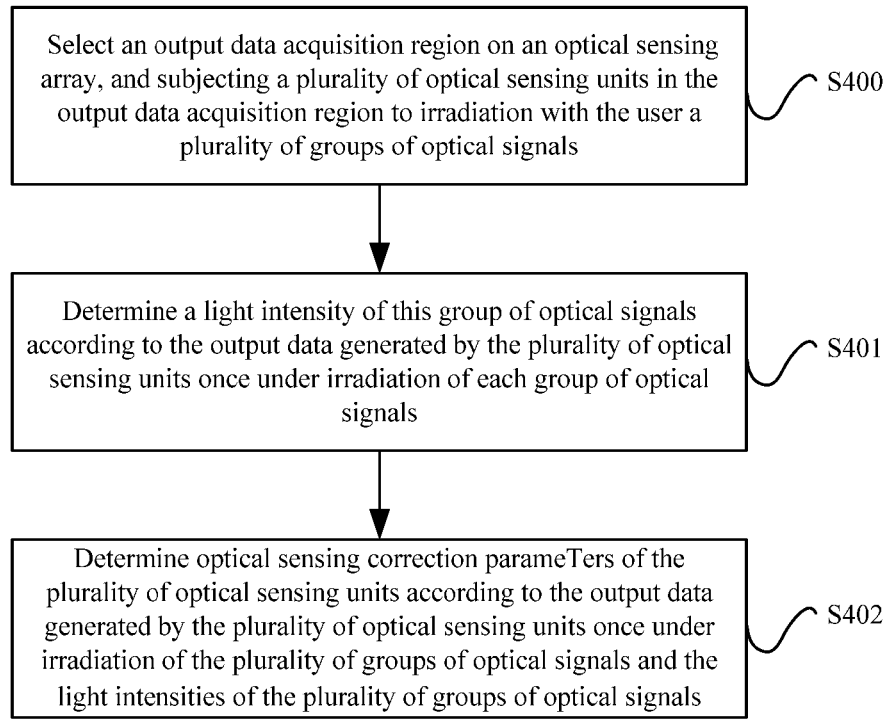
FIG. 4 is a schematic flowchart of a method for determining optical sensing correction parameters according to a fourth embodiment of the present application.

FIG. 4 is a schematic flowchart of a method for determining optical sensing correction parameters according to a fourth embodiment of the present application. In this embodiment, as illustrated in FIG. 4, a plurality of groups of optical signals sequentially are used such that a plurality of optical sensing units of an optical sensing array are sequentially irradiated, where the plurality of optical sensing units are specifically located within the output data acquisition region. The method includes the following steps:

S400: An output data acquisition region is selected on an optical sensing array, and a plurality of optical sensing units in the output data acquisition region are irradiated respectively with the use of a plurality of groups of optical signals.

S401: A light intensity of each group of optical signals is determined according to the output data generated by the plurality of optical sensing units once under irradiation of the group of optical signals.

In this embodiment, in a constant illumination environment, a plurality of optical sensing units in the output data acquisition region are respectively irradiated using a plurality of groups of optical signals. Specifically, the constant illumination environment may be practiced by, but not limited to, the following two manners: covering a surface-uniform article on the surface of an electronic terminal employing the optical sensing array, or directly arranging an electronic terminal employing the optical sensing array in a darkroom. In these two manners, the plurality of optical sensing units for data acquisition in the optical sensing array may be subjected to the constant illumination environment.

In this embodiment, if the optical sensing array is applied to an electronic terminal, the plurality of groups of optical signals may be generated using a plurality of light sources outside the electronic terminal, or may be generated by a plurality of OLED light sources within the electronic terminal.

Light intensities of the groups of optical signals may be determined by performing step S401 for multiple times. For example, in this embodiment, assuming that the acquisition region has Q optical sensing units and the Q optical sensing units are irradiated with the use of M groups of optical signals, when the Q optical sensing units are irradiated with the use of one group of optical signals, the light intensity of the group of optical signals may be determined according to Q pieces of output data. By such analogy, M light intensities may be determined.

In this embodiment, each group of optical signals includes a plurality of optical signals having an identical light intensity. For example, specifically, the optical sensing units are irradiated for multiple times with the use of the optical signals having the identical light intensity. Therefore, the plurality of optical sensing units in the output data acquisition region may acquire multiple frames of output data once under irradiation of each group of optical signals. Each optical sensing unit may acquire multiple pieces of output data once under irradiation of the same group of optical signals. The multiple pieces of output data may constitute a group of output data generated by the optical sensing unit once under irradiation of this group of optical signals. Correspondingly, the plurality of optical sensing units in the output data acquisition region may correspondingly generate a plurality of groups of output data once under irradiation of the same group of optical signals.

Figure 5:
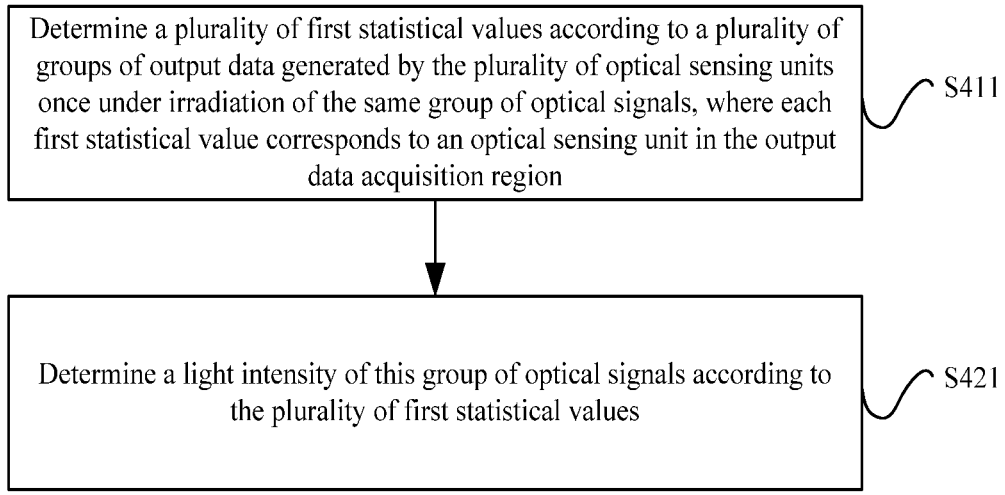
FIG. 5 is a schematic flowchart of determining a light intensity according to a fifth embodiment of the present application.

As illustrated in FIG. 5, a schematic flowchart of determining a light intensity according to a fifth embodiment of the present application is given. Step S401 may specifically include the following steps:

S411: A plurality of first statistical values are determined according to a plurality of groups of output data, which are generated by the plurality of optical sensing units once under irradiation of the same group of optical signals, respectively; each first statistical value corresponds to an optical sensing unit in the output data acquisition region.

Specifically, the first statistical value is an average value of multiple pieces of output data generated by each optical sensing unit in the output data acquisition region once under irradiation of one group of optical signals, for example, an arithmetic average value, a weighted arithmetic average value or the like. As described above, once under irradiation of the same group of optical signals, each optical sensing unit corresponds to one group of output data. Therefore, the first statistical value of the output data of the optical sensing unit may be obtained by calculating an average value of this group of output data. Correspondingly, Q optical sensing units may acquire Q groups of output data. Therefore, Q first statistical values may be correspondingly obtained via calculation.

S421: A light intensity of this group of optical signals is determined according to the plurality of first statistical values.

Specifically, step S421 may include: determining a second statistical value corresponding to this group of optical signals according to the plurality of first statistical values, and using the second statistical value as the light intensity of this group of optical signal. Specifically, the second statistical value is an average value of the plurality of first statistical values. As described above, once under irradiation of each group of optical signals, Q first statistical values may be calculated according to the Q groups of output data acquired by the Q optical sensing units. Therefore, the second statistical value may be an average value of the Q first statistical values. That is, with respect to each group of optical signals, one second statistical value may be correspondingly obtained.

Correspondingly, after the optical sensing units in the acquisition region are respectively irradiated using M groups of optical signals, M second statistical values may be calculated using the way provided in this embodiment. The M second statistical values may be respectively used as M light intensities corresponding to the M groups of optical signals.

S402: Optical sensing correction parameters of the plurality of optical sensing units are determined according to the output data generated by the plurality of optical sensing units once under irradiation of the plurality of groups of optical signals and the light intensities of the plurality of groups of optical signals.

Figure 6:
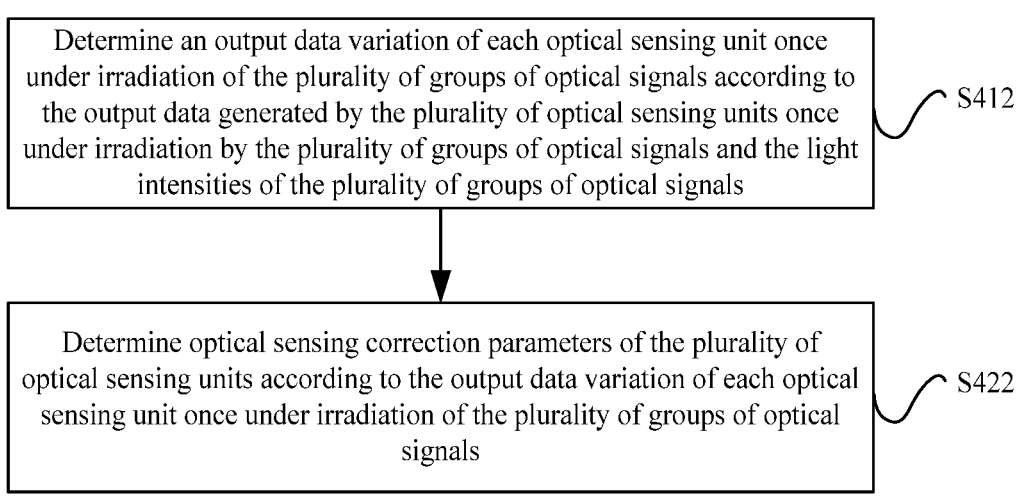
FIG. 6 is a schematic flowchart of determining optical sensing correction parameters according to a sixth embodiment of the present application.

In this embodiment, as illustrated in FIG. 6, a schematic flowchart of determining optical sensing correction parameters according to a sixth embodiment of the present application is given. Step S402 may specifically include the following steps:

S412: An output data variation of each optical sensing unit once under irradiation of the plurality of groups of optical signals is determined, according to the output data generated by the plurality of optical sensing units once under irradiation of the plurality of groups of optical signals, and the light intensities of the plurality of groups of optical signals.

In an application scenario of fingerprint feature identification, generally the output data of the optical sensing units is in linear relation with the light intensities of the optical signals. Therefore, the greater the light intensities of the optical signals, the greater the output data of the optical sensing units; on the contrary, the smaller the light intensities of the optical signals, the less the output data of the optical sensing units. Correspondingly, greater output data of the optical sensing units indicates greater light intensities of the optical signals, while less output data of the optical sensing units indicates smaller light intensities of the optical signals.

S422: Optical sensing correction parameters of the plurality of optical sensing units are determined according to the output data variation of each optical sensing unit once under irradiation of the plurality of groups of optical signals.

Figure 7:
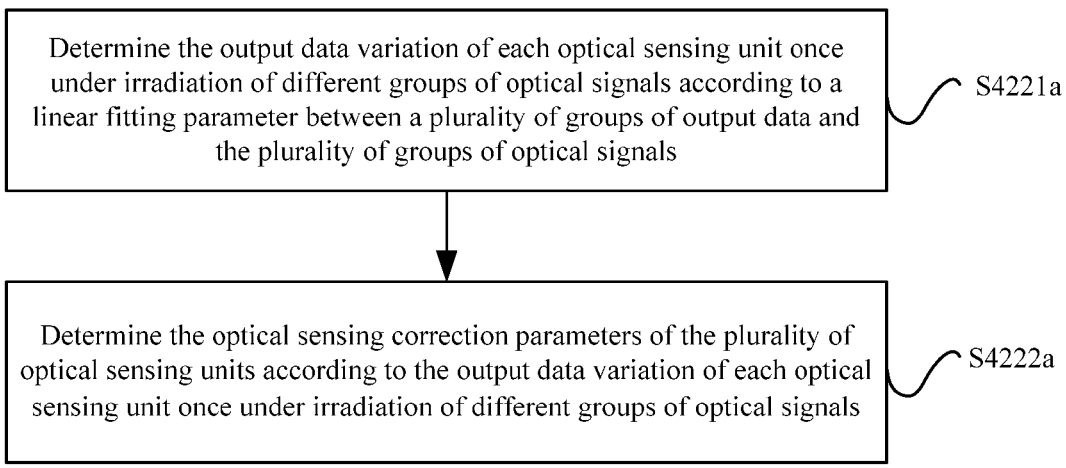
FIG. 7 is a schematic flowchart of determining optical sensing correction parameters based on output data variations according to a seventh embodiment of the present application.

As described above, each optical sensing unit generates one group of output data once under irradiation of one group of optical signals, and generates a plurality of groups of output data once under irradiation of a plurality of groups of optical signals. As illustrated in FIG. 7, a schematic flowchart of determining optical sensing correction parameters based on output data variations according to a seventh embodiment of the present application is given. In this embodiment, step S422 may specifically include the following steps:

S4221a: determining the output data variation of each optical sensing unit once under irradiation of different groups of optical signals according to a linear fitting parameter between a plurality of groups of output data and the plurality of groups of optical signals; and S4221a: determining the optical sensing correction parameters of the plurality of optical sensing units according to the output data variation of each optical sensing unit once under irradiation of different groups of optical signals.

Specifically, in the embodiment as illustrated in FIG. 7, step S4221a may specifically include:

performing two different statistical value calculations for the light intensities of the plurality of groups of optical signals to obtain a third statistical value and a fourth statistical value; where specifically, for example, the third statistical value is an average value of first powers of the light intensities of the plurality of groups of optical signals, and the fourth statistical value is an average value of squares of the light intensities of the plurality of groups of optical signals; and determining the linear fitting parameter between the plurality of groups of output data and the plurality of groups of optical signals according to the third statistical value and the fourth statistical value.

Specifically, in step S4221a, the linear fitting parameter between the plurality of groups of output data and the plurality of groups of optical signals may be specifically determined according to a difference between the third statistical value and the fourth statistical value.

As described above, the output data of the optical sensing units is in linear relation with the light intensities of different groups of optical signals, different linear fitting parameters are obtained by means of linear fitting between the output data of the optical sensing units and the light intensities of the optical signals. Therefore, fitting output data may be obtained by substituting the light intensities of the optical signals as arguments into linear fitting functions formed by different linear fitting parameters. If there is a linear fitting function which renders a difference or a square of the difference between the fitting output data of each optical sensing unit of the output data acquisition region and the output data prior to fitting (that is, data actually output once under irradiation of any group of the M groups of optical signals) to be the minimum, linear fitting parameters of this linear fitting function are directly used as the optical sensing correction parameters of the corresponding one of the plurality of optical sensing units. It should be noted that the difference is used to represent output data variations, and the output data variations refer to relative variations of the output data before and after fitting.

Figure 8:
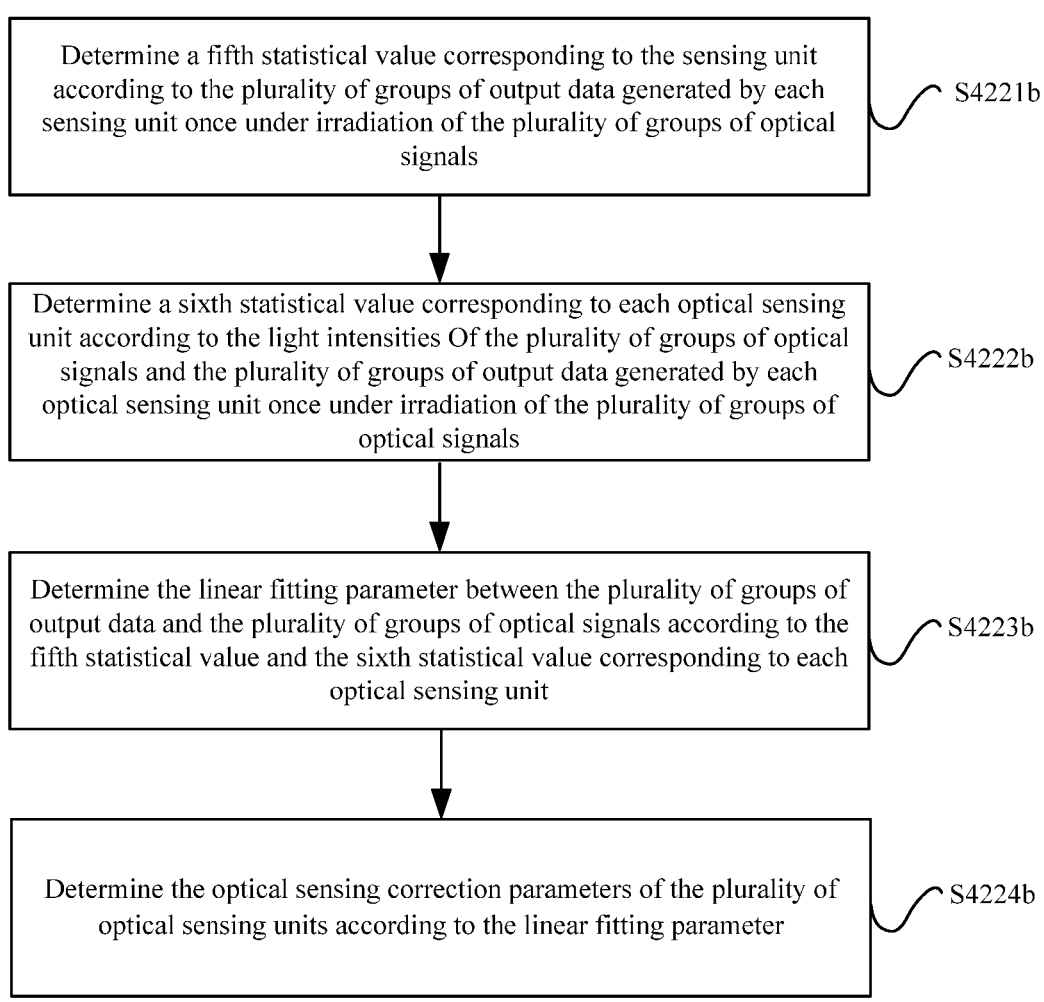
FIG. 8 is a schematic flowchart of determining optical sensing correction parameters based on output data variations according to an eighth embodiment of the present application.

As illustrated in FIG. 8, a schematic flowchart of determining optical sensing correction parameters based on output data variations according to an eighth embodiment of the present application is given. Step S422 in FIG. 6 may specifically include the following steps:

S4221b: A fifth statistical value corresponding to the optical sensing unit is determined according to the plurality of groups of output data generated by each optical sensing unit once under irradiation of the plurality of groups of optical signals.

As described above, each optical sensing unit generates one group of output data once under irradiation of each group of optical signals, and thus M groups of output data may be generated by subjecting the same optical sensing unit to irradiation sequentially with the use of M groups of optical signals.

In this embodiment, the fifth statistical value is an average value of the plurality of groups of output data generated by the plurality of optical sensing units under irradiation by the plurality of groups of optical signals. As described above, for example, the fifth statistical value is an average value of the M groups of output data generated by each optical sensing unit under irradiation by the M groups of optical signals. That is, if the optical sensing units in the acquisition region are irradiated using M groups of optical signals, each optical sensing unit may obtain M groups of output data. That is, by calculating an average value of the M groups of output data, the fifth statistical value corresponding to the optical sensing unit may be obtained.

S4222b: A sixth statistical value corresponding to each optical sensing unit is determined according to the light intensities of the plurality of groups of optical signals and the plurality of groups of output data generated by each optical sensing unit under irradiation by the plurality of groups of optical signals.

As described above, the optical sensing units in the acquisition region are sequentially irradiated using the M groups of optical signals, and each optical sensing unit may generate M groups of output data. In this embodiment, the sixth statistical value is an average value of products of the light intensities of the plurality of optical signals and the plurality of groups of output data. Therefore, each optical sensing unit may correspond to one sixth statistical value, and thus the Q optical sensing units in the acquisition region respectively correspond to Q sixth statistical values.

S4223b: The linear fitting parameter between the plurality of groups of output data and the plurality of groups of optical signals is determined according to the fifth statistical value and the sixth statistical value corresponding to each optical sensing unit.

In this embodiment, in step S4223b, the linear fitting parameter between the plurality of groups of output data and the plurality of groups of optical signals may be specifically determined according to a difference between the fifth statistical value and the sixth statistical value.

S4224b: The optical sensing correction parameters of the plurality of optical sensing units are determined according to the linear fitting parameter.

As described above, the output data of the optical sensing units is in linear relation with the light intensities of the optical signals, different linear fitting parameters are obtained by means of linear fitting between the output data of the optical sensing units and the light intensities of the optical signals. Fitting output data may be obtained by substituting the light intensities of the optical signals as arguments into linear fitting functions formed by different linear fitting parameters. If there is a linear fitting function which renders a difference or a square of the difference between the fitting output data of each optical sensing unit of the output data acquisition region and the output data prior to fitting (that is, actual output data under irradiation by any group of the M groups of optical signals) to be the minimum, linear fitting parameters of this linear fitting function are directly used as the optical sensing correction parameters of the corresponding one of the plurality of optical sensing units in the entire sensing array.

Figure 9:
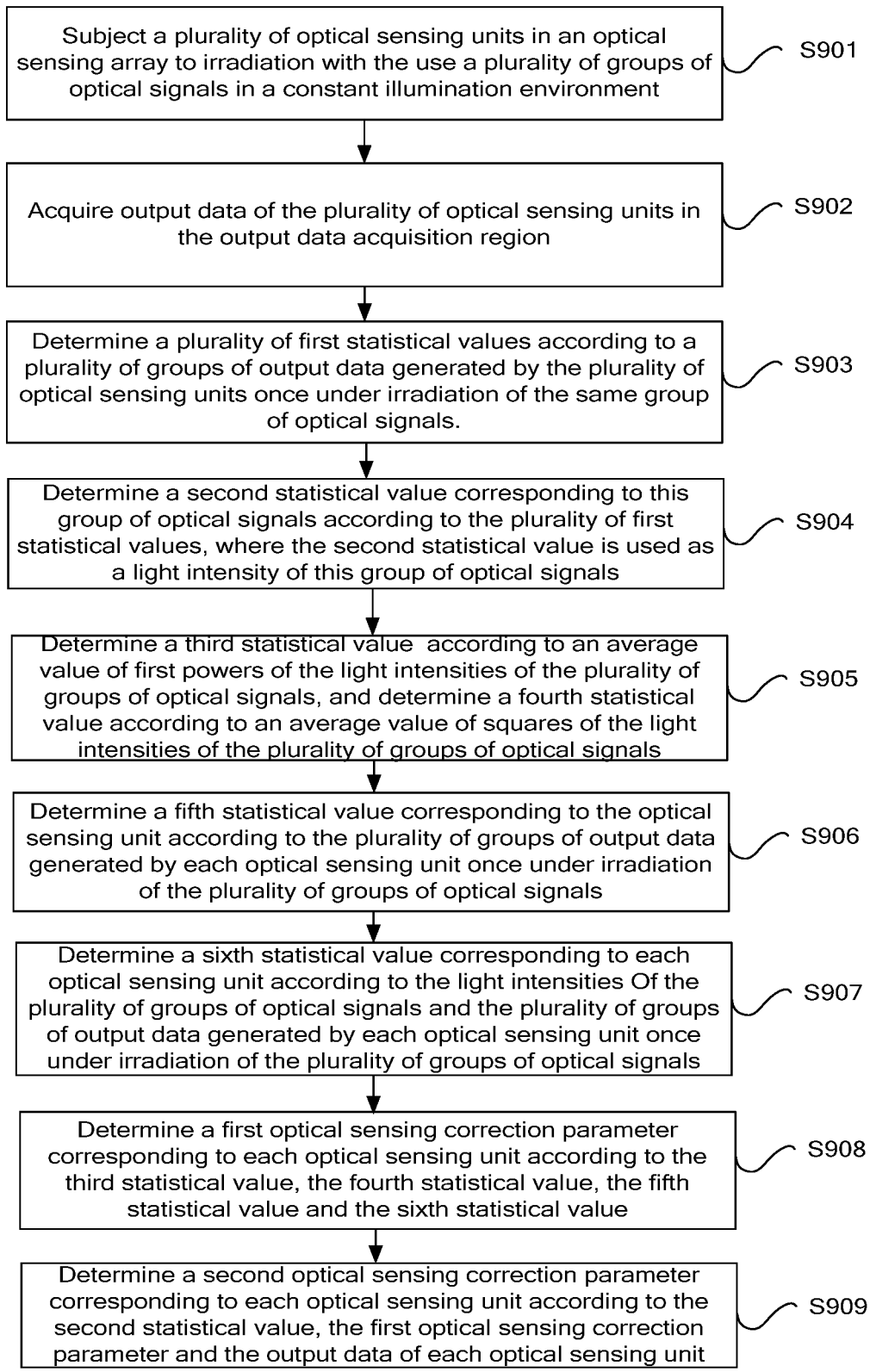
FIG. 9 is a schematic flowchart of a method for determining optical sensing correction parameters in a specific application scenario according to a ninth embodiment of the present application.

FIG. 9 is a schematic flowchart of a method for determining optical sensing correction parameters in a specific application scenario according to a ninth embodiment of the present application. In this embodiment, with reference to the linear fitting parameter determined in FIG. 7 and FIG. 8, specifically, as illustrated in FIG. 9, the method for determining optical sensing correction parameters includes the following steps:

S901: In a constant illumination environment, a plurality of optical sensing units in an optical sensing array are irradiated using a plurality of groups of optical signals.

As described above, specifically, when a plurality of optical sensing units in the optical sensing array are irradiated using M groups of optical signals, establishment of the constant illumination environment may be referenced to the description of the above embodiment.

It should be noted that under irradiation with the use of the M groups of optical signals, a plurality of optical sensing units in an output data acquisition region may be only irradiated; in other words, only a plurality of optical sensing units in an output data acquisition region receive the irradiation.

S902: Output data of the plurality of optical sensing units in the output data acquisition region is acquired.

Specifically, a biological feature detection apparatus acquires the output data of the optical sensing units by scanning the plurality of optical sensing units. With respect to each optical sensing unit, scanning once may acquire one piece of output data, and scanning for multiple times may acquire multiple pieces of output data, such that a group of output data as described is formed.

S903: A plurality of first statistical values are determined according to a plurality of groups of output data generated by the plurality of optical sensing units once under irradiation of the same group of optical signals.

In this embodiment, a first statistical value $y_{i,j,m}$ corresponding to each optical sensing unit may be determined by using the following formula (1):

$$y_{i,j,m} = \frac{\sum_{n=1}^{N} D_{i,j,n}}{N} \quad (1)$$

$D_{i,j,n}$ the nth piece of output data of the optical sensing unit in the $i^{th}$ row and the $j^{th}$ column in the optical sensing array once under irradiation of one group of optical signals, where n is a positive integer and $0<n<=N$, one group of output data includes N pieces of output data, and the first statistical value $y_{i,j,m}$ may also be referred to as average output data.

S904: A second statistical value corresponding to this group of optical signals is determined according to the plurality of first statistical values, where the second statistical value is used as a light intensity of this group of optical signals.

Steps S903 and S904 are repeatedly performed until a plurality of second statistical values corresponding to the number of groups of the optical signals are determined. Specifically, the light intensity reflecting an intensity of each group of light signals is determined by using the following formula (2):

$$X_m = \frac{1}{(i2-i1)*(j2-j1)} \sum_{i=i1}^{i2} \sum_{j=j1}^{j2} y_{i,j,m} \quad (2)$$

$X_m$ is the second statistical value, that is, an average value of the corresponding $(i1-i2)*(j1-j2)$ first statistical values $y_{i,j,m}$ under irradiation of the $m^{th}$ group of optical signals, where m is a positive integer and $0<m<=M$, i1,i2, j1 and j2 are positive integers, i1<i2, j1<j2, i1 represents the i1th row in the entire optical sensing array, i2 represents the i2th row in the entire optical sensing array, j1 represents the j1th column in the entire optical sensing array, and j2 represents the j2th column in the entire optical sensing array.

In formula (2), i1, i2, j1 and j2 define the size of the output data acquisition region. Thus, the number of optical sensing units in the output data acquisition region is $(i1-i2)*(j1-j2)$, and correspondingly the number of first statistical values is also $(i1-i2)*(j1-j2)$. In this case, a light intensity of the $m^{th}$ groups of optical signals is the average value of the $(i1-i2)*(j1-j2)$ first statistical values, and thus M second statistical values are obtained.

S905: A third statistical value is determined according to an average value of first powers of the light intensities of the plurality of groups of optical signals, and a fourth statistical value is determined according to an average value of squares of the light intensities of the plurality of groups of optical signals.

The third statistical value and the fourth statistical value are respectively determined by using the following formulae (3) and (4):

$$\overline{X_{i,j}} = \frac{1}{M}\sum_{m=1}^{M} X_m \quad (3)$$

In formula (3), $\overline{X_{i,j}}$ is the third statistical value which is determined according to the average value of the first powers of the light intensities of the M groups of optical signals with respect to the optical sensing unit in the $i^{th}$ row and the $j^{th}$ column in the optical sensing array.

$$\overline{X_{i,j}^2} = \frac{1}{M}\sum_{m=1}^{M} X_m^2 \quad (4)$$

In formula (4), $\overline{X_{i,j}^2}$ isis the fourth statistical value which is determined according to the average value of the squares of the light intensities of the M groups of optical signals with respect to the optical sensing unit in the $i^{th}$ row and the $j^{th}$ column in the optical sensing array.

S906: A fifth statistical value corresponding to the optical sensing unit is determined according to the plurality of groups of output data generated by each optical sensing unit once under irradiation of the plurality of groups of optical signals.

The fifth statistical value may be determined by using the following formula (5):

$$\overline{Y_{i,j}} = \frac{1}{M}\sum_{m=1}^{M} y_{i,j,m} \quad (5)$$

In formula (5), $\overline{Y_{i,j}}$ is an average value of the average output data generated by the optical sensing unit in the $i^{th}$ row and $j^{th}$ column in the optical sensing array once under irradiation of the M groups of optical signals, where this average value is used as the fifth statistical value.

S907: A sixth statistical value corresponding to each optical sensing unit is determined according to the light intensities of the plurality of groups of optical signals and the plurality of groups of output data generated by each optical sensing unit once under irradiation of the plurality of groups of optical signals.

$$\overline{X_{i,j}Y_{i,j}} = \frac{1}{M}\sum_{m=1}^{M} X_m \cdot y_{i,j,m} \quad (6)$$

In formula (6), $\overline{X_{i,j}Y_{i,j}}$ is an average value of products of the average output data generated by the optical sensing unit in the $i^{th}$ row and $j^{th}$ column in the optical sensing array once under irradiation of the M groups of optical signals and the light intensities of the M groups of optical signals, where this average value is used as the sixth statistical value.

S908: A first optical sensing correction parameter corresponding to each optical sensing unit is determined according to the third statistical value, the fourth statistical value, the fifth statistical value and the sixth statistical value.

S909: A second optical sensing correction parameter corresponding to each optical sensing unit is determined according to the second statistical value, the first optical sensing correction parameter and the output data of each optical sensing unit.

The first optical sensing correction parameter and the second optical sensing correction parameter are determined by using the following formulae (7) and (8):

$$K = (\overline{X_{i,j}Y_{i,j}} - \overline{X_{i,j}}\,\overline{Y_{i,j}})/(\overline{X_{i,j}^2} - \overline{X_{i,j}}^2) \quad (7)$$

$$B = \overline{Y_{i,j}} - K\overline{X_{i,j}} \quad (8)$$

In formula (7), with respect to the optical sensing unit in the $i^{th}$ row and the $i^{th}$ column in the optical sensing array, K represents the first optical sensing correction parameter corresponding to the optical sensing unit, and B represents the second optical sensing correction parameter corresponding to the optical sensing unit.

It should be noted that since the plurality of optical sensing units are provided, a plurality of third statistical values and fourth statistical values are available. Correspondingly, a plurality of determined first optical sensing correction parameters and second optical sensing correction parameters are available.

Each pair of first optical sensing correction parameter and second optical sensing correction parameter may form a linear fitting function. Fitting output data may be obtained by substituting the light intensities of the optical signals as arguments into the linear fitting function. If there is a linear fitting function which renders a difference or a square of the difference between the fitting output data of each optical sensing unit of the output data acquisition region and the output data prior to fitting (that is, actual output data once under irradiation of any group of the M groups of optical signals) to be the minimum, the first optical sensing correction parameter and second optical sensing correction parameter corresponding to this linear fitting function are directly used as the optical sensing correction parameters of the corresponding one of the plurality of the corresponding optical sensing unit in the sensing array.

Specifically, the above method may further include: determining the corrected light intensity according to the output data generated by the plurality of optical sensing units once under irradiation of each group of optical signals, and the optical sensing correction parameters of the plurality of optical sensing units.

Figure 10:
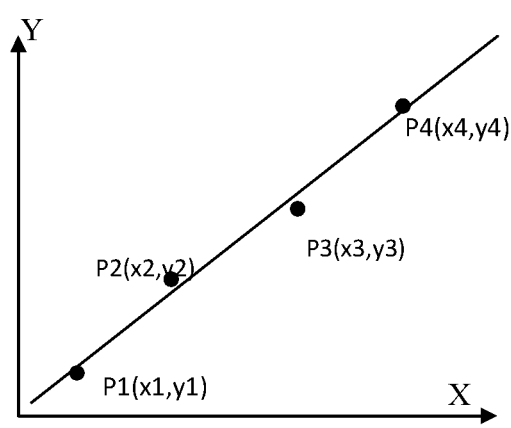
FIG. 10 is a schematic diagram of a linear fitting function for determining optical sensing correction parameters in a specific application scenario according to a tenth embodiment of the present application.

FIG. 10 is a schematic diagram of a linear fitting function for determining optical sensing correction parameters in a specific application scenario according to a tenth embodiment of the present application. As illustrated in FIG. 10, the horizontal coordinate represents a light intensity of the optical signals, and the vertical coordinate represents output data of the optical sensing units. In FIG. 10, the inclined straight line represents a linear fitting function determined according to the first optical sensing correction parameter and the second optical sensing correction parameter. The first optical sensing correction parameter represents a slope of the straight line, the second optical sensing correction parameter represents an intercept of the straight line, and the solid dots on both sides of the inclined straight line represent output data generated by the optical sensing units once under irradiation of a group of optical signals. Once under irradiation of the same group of optical signals, each optical sensing unit has one fitting light intensity on the inclined straight line. As mentioned, with respect to each optical sensing unit, the output data is used as a dependent variable and is substituted into a straight line representing a linear fitting function to obtain a fitting light intensity. In this way, the output data of the optical sensing unit is corrected.

In this embodiment, the linear fitting function is as follows:

$$Y = KX + B \quad (9)$$

In formula (9), k represents a first optical sensing correction parameter, B represents a second optical sensing correction parameter, X represents a light intensity and Y represents output data of the optical sensing unit.

As illustrated in FIG. 10, when the P1th optical sensing unit in an optical sensing array receives irradiation by the same group of optical signals, actual output data is Y1, and the actual output data Y1 is substituted into the linear fitting function representing an inclined straight line to obtain a fitting light intensity X1'. When the light intensity of the optical signals received by the P2th optical sensing unit is X2, actual output data is Y2, and the actual output data Y2 is substituted into the linear fitting function representing an inclined straight line to obtain a fitting light intensity X2', and so on.

As mentioned, theoretically, when no touch by a finger is received, the output data of each optical sensing unit should be consistent once under irradiation of the same group of optical signals. However, the output data of the optical sensing units is not consistent because capabilities of sensing light intensities by the optical sensing units are different due to example causes given in the background. Therefore, in the embodiment of the present application, optical sensing correction parameters are determined, and fitting light intensities X1', X2' . . . of all the optical sensing units are corrected to the same light intensity X according to the optical sensing correction parameters and the output data. In this way, a corrected light intensity is obtained. Referring to formula (9), if the light intensities are the same, the output data of each light sensing unit is the same once under irradiation of the same group of light signals, such that the optical sensing units have the consistent light intensity sensing capability with respect to the same group of optical signals.

Therefore, optical sensing correction parameters are determined before electronic terminals are delivered from factory when biological feature detection apparatuses are not touch by fingers or the like. However, it should be noted that when the biological feature detection apparatus is applied to the electronic terminal, during use of the electronic terminal, the optical sensing correction parameters may also be determined when the biological feature detection apparatus is not touched.

In addition, based on the above embodiments, the method may further include: storing the optical correction parameters of the optical sensing units in a memory; and during biological feature detection, correcting the output data of the optical sensing units according to the optical correction parameters.

Embodiments of the present application further provide a biological feature detection apparatus. The biological feature detection apparatus includes an optical sensing array and a detection chip. The optical sensing array includes a plurality of optical sensing units configured to receive irradiation from the plurality of groups of optical signals, where each optical sensing unit generates a group of output data once under irradiation of each group of optical signals. The detection chip is configured to determine a light intensity of this group of optical signals according to the output data generated by the plurality of optical sensing units once under irradiation of the same group of optical signals to determine light intensities of the plurality of groups of optical signals, and determine optical sensing correction parameters of the plurality of optical sensing units according to output data generated by the plurality of optical sensing units once under irradiation of each groups of optical signals and the light intensities of the plurality of groups of optical signals.

Embodiments of the present application further provide an electronic terminal. The electronic terminal includes the above biological feature detection apparatus.

In the above embodiments, if a plurality of optical sensing units is arranged in the output data acquisition region, the above method steps may be performed for each optical sensing unit in the output data acquisition region. Nevertheless, in other embodiments, the above method steps may also be performed for a portion of optical sensing units from the plurality of optical sensing units in the output data acquisition region. Therefore, the term "each" in the above embodiments denotes a relative concept, which does not signify each optical sensing unit of all the optical sensing units in the output data acquisition region and may be each optical sensing unit in a portion of the optical sensing units.

Finally, it should be noted that the above embodiments are merely intended to describe the technical solutions of the embodiments of the present application, instead of limiting the present application. Although the present application is described in detail with reference to the above embodiments, persons of ordinary skill in the art should understand that various modifications may be made to the technical solutions described in the above embodiments or equivalent replacements may be made to some technical features thereof, without departing from the spirit and scope of the technical solutions of the embodiments of the present application.

According to the above embodiments of the present application, a person skilled in the art may clearly understand that the embodiments of the present application may be implemented by means of hardware or by means of software plus a necessary general hardware platform. Based on such understanding, portions of the technical solutions of the present application that essentially contribute to the related art may be embodied in the form of a software product, the computer software product may be stored in a computer readable storage medium. The computer-readable storage medium includes any mechanism for storing or transferring information in a computer readable form.

A person skilled in the art shall understand that the embodiments may be described to illustrate methods, apparatuses (devices), or computer program products. Therefore, hardware embodiments, software embodiments, or hardware-plus-software embodiments may be used to illustrate the embodiments of the present application. In addition, the embodiments of the present application may further employ a computer program product which may be implemented by at least one non-transitory computer-readable storage medium with an executable program code stored thereon. The non-transitory computer-readable storage medium comprises but not limited to a disk memory, a CD-ROM, and an optical memory.

The embodiments of the present application are described based on the flowcharts and/or block diagrams of the method, apparatus (device), and computer program product according to the embodiments of the present application. It should be understood that each process and/or block in the flowcharts and/or block diagrams, and any combination of the processes and/or blocks in the flowcharts and/or block diagrams may be implemented using computer program instructions. These computer program instructions may be issued to a computer, a dedicated computer, an embedded processor, or processors of other programmable data processing device to generate a machine, which enables the computer or the processors of other programmable data processing devices to execute the instructions to implement an apparatus for implementing specific functions in at least one process in the flowcharts and/or at least one block in the block diagrams.

These computer program instructions may also be stored a non-transitory computer-readable memory capable of causing a computer or other programmable data processing devices to work in a specific mode, such that the instructions stored on the non-transitory computer-readable memory implement a product comprising an instruction apparatus, where the instruction apparatus implements specific functions in at least one process in the flowcharts and/or at least one block in the block diagrams.

These computer program instructions may also be stored on a computer or other programmable data processing devices, such that the computer or the other programmable data processing devices execute a series of operations or steps to implement processing of the computer. In this way, the instructions, when executed on the computer or the other programmable data processing devices, implement the specific functions in at least one process in the flowcharts and/or at least one block in the block diagrams.

Although preferred embodiments of the present application are described, those skilled in the art may make modifications and variations to these embodiments based on the basic inventive concept of the present application. Therefore, the appended claims are interpreted as covering the preferred embodiments and all such modifications and variations falling within the protection scope of the embodiments of the present application. Apparently, a person skilled in the art may make various modifications and variations to the present application without departing from the spirit and principles of the present application. If such modifications and variations fall within the scope defined by the claims of the present application and equivalent technologies thereof, the present application is intended to cover such modifications and variations.

What is claimed is:

1. A method for determining optical sensing correction parameters, comprising:
   subjecting a plurality of optical sensing units in an optical sensing array to irradiation respectively with the use of a plurality of groups of optical signals, wherein each optical sensing unit generates a group of output data once under irradiation of each group of optical signals;
   determining a light intensity of this group of optical signals according to the output data generated by the plurality of optical sensing units once under irradiation of the same group of optical signals; and
   determining optical sensing correction parameters of the plurality of optical sensing units according to the output data generated by the plurality of optical sensing units once under irradiation of the plurality of groups of optical signals and the light intensities of the plurality of groups of optical signals.

2. The method according to claim 1, wherein the plurality of optical sensing units in the optical sensing array are sequentially irradiated with the use of the plurality of groups of optical signals at a constant light environment.

3. The method according to claim 2, wherein the constant light environment is implemented by: covering a surface-uniform object on a surface of an electronic terminal using the optical sensing array, or placing the electronic terminal using the optical sensing array in a darkroom.

4. The method according to claim 1, wherein the plurality of groups of optical signals are generated by a light source arranged outside an electronic terminal using the optical sensing array, or are generated by a display light source inside the electronic terminal.

5. The method according to claim 1, wherein the determining a light intensity of this group of optical signals according to the output data generated by the plurality of optical sensing units once under irradiation of the same group of optical signals comprises:
   respectively determining a plurality of first statistical values according to a plurality of pieces of output data generated by the plurality of optical sensing units once under irradiation of the same group of optical signals, wherein each first statistical value corresponds to an optical sensing unit; and
   determining a light intensity of each group of optical signals according to the plurality of first statistical values.

6. The method according to claim 5, wherein the first statistical value is an average value of a group of output data generated by a corresponding optical sensing unit once under irradiation of a group of optical signals.

7. The method according to claim 5, wherein the determining a light intensity of each group of optical signals according to the plurality of first statistical value comprises:
   determining a second statistical value corresponding to a group of optical signals according to the plurality of first statistical values, and using the second statistical value as the light intensity of this group of optical signals.

8. The method according to claim 7, wherein the second statistical value is an average value of the plurality of first statistical values.

9. The method according to claim 1, wherein determining optical sensing correction parameters of the plurality of optical sensing units according to the output data generated by the plurality of optical sensing units once under irradiation of the plurality of groups of optical signals and the light intensities of the plurality of groups of optical signals comprises:
   determining an output data variation of each optical sensing unit once under irradiation of the plurality of groups of optical signals according to the output data generated by the plurality of optical sensing units once under irradiation of the plurality of groups of optical signals and the light intensities of the plurality of groups of optical signals; and
   determining optical sensing correction parameters of the plurality of optical sensing units according to the output data variation of each optical sensing unit once under irradiation of the plurality of groups of optical signals.

10. The method according to claim 9, wherein
   the determining optical sensing correction parameters of the plurality of optical sensing units according to the output data variation of each optical sensing unit once under irradiation of the plurality of groups of optical signals comprises:
   determining the output data variation of each optical sensing unit once under irradiation of different groups of optical signals according to a linear fitting parameter between a plurality of groups of output data and the plurality of groups of optical signals; and
   determining the optical sensing correction parameters of the plurality of optical sensing units according to the output data variation of each optical sensing unit once under irradiation of different groups of optical signals.

11. The method according to claim 10, wherein the linear fitting parameter between the plurality of groups of output data and the plurality of groups of optical signals is obtained by:
performing two different statistical value calculations for the light intensities of the plurality of groups of optical signals to obtain a third statistical value and a fourth statistical value; and
determining the linear fitting parameter between the plurality of groups of output data and the plurality of groups of optical signals according to the third statistical value and the fourth statistical value.

12. The method according to claim 11, wherein the third statistical value is an average value of first powers of the light intensities of the plurality of groups of optical signals, and the fourth statistical value is an average value of squares of the light intensities of the plurality of groups of optical signals.

13. The method according to claim 11, wherein the linear fitting parameter is determined according to a difference between the third statistical value and the fourth statistical value.

14. The method according to claim 10, wherein the determining the output data variation of each optical sensing unit once under irradiation of different groups of optical signals according to a linear fitting parameter between a plurality of groups of output data and the plurality of groups of optical signals comprises:
determining a fifth statistical value corresponding to the sensing unit according to the plurality of groups of output data generated by each sensing unit once under irradiation of the plurality of groups of optical signals;
determining a sixth statistical value corresponding to each optical sensing unit according to the light intensities of the plurality of groups of optical signals and the plurality of groups of output data generated by each optical sensing unit once under irradiation of the plurality of groups of optical signals; and
determining the linear fitting parameter between the plurality of groups of output data and the plurality of groups of optical signals according to the fifth statistical value and the sixth statistical value corresponding to each optical sensing unit.

15. The method according to claim 14, wherein the fifth statistical value is an average value of the plurality of groups of output data generated by each optical sensing unit once under irradiation of the optical signals, and the sixth statistical value is an average value of products of the light intensities of the optical signals and the plurality of groups of output data.

16. The method according to claim 14, wherein the linear fitting parameter is determined according to a difference between the fifth statistical value and the sixth statistical value.

17. The method according to claim 1, further comprising:
storing the optical correction parameters of the optical sensing units in a memory; and
during biological feature detection, correcting the output data of the optical sensing units according to the optical correction parameters.

18. A biological feature detection apparatus, comprising:
an optical sensing array, comprising a plurality of optical sensing units configured to receive irradiation from the plurality of groups of optical signals, each optical sensing unit generating a group of output data once under irradiation of each group of optical signals; and
a detection chip, configured to determine a light intensity of this group of optical signals according to the output data generated by the plurality of optical sensing units once under irradiation of the same group of optical signals to determine light intensities of the plurality of groups of optical signals, and determine optical sensing correction parameters of the plurality of optical sensing units according to output data generated by the plurality of optical sensing units once under irradiation of each groups of optical signals and the light intensities of the plurality of groups of optical signals.

19. An electronic terminal, comprising a processor configured to implement a method comprising:
determining a light intensity of a group of optical signals according to output data generated by a plurality of optical sensing units in an optical sensing array once under irradiation of the group of optical signals, wherein the plurality of optical sensing units is subjected to irradiation respectively with the use of a plurality of groups of optical signals, and each optical sensing unit generates a group of output data once under irradiation of each group of optical signals, and
determining optical sensing correction parameters of the plurality of optical sensing units according to the output data generated by the plurality of optical sensing units once under irradiation of the plurality of groups of optical signals and the light intensities of the plurality of groups of optical signals.

* * * * *